Oct. 11, 1966  R. M. CLARK  3,277,893
HYPODERMIC PROJECTILE WITH BARB IN THE CANNULA BEVEL
Filed Jan. 31, 1964  2 Sheets-Sheet 1

INVENTOR.
ROBERT M. CLARK
BY
Kane, Dalsimer and Kane
ATTORNEYS

Oct. 11, 1966 R. M. CLARK 3,277,893
HYPODERMIC PROJECTILE WITH BARB IN THE CANNULA BEVEL
Filed Jan. 31, 1964 2 Sheets-Sheet 2
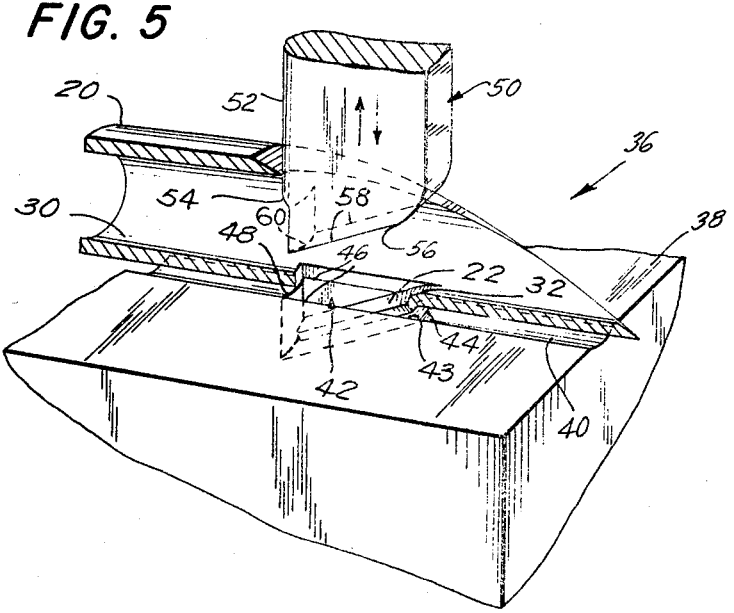
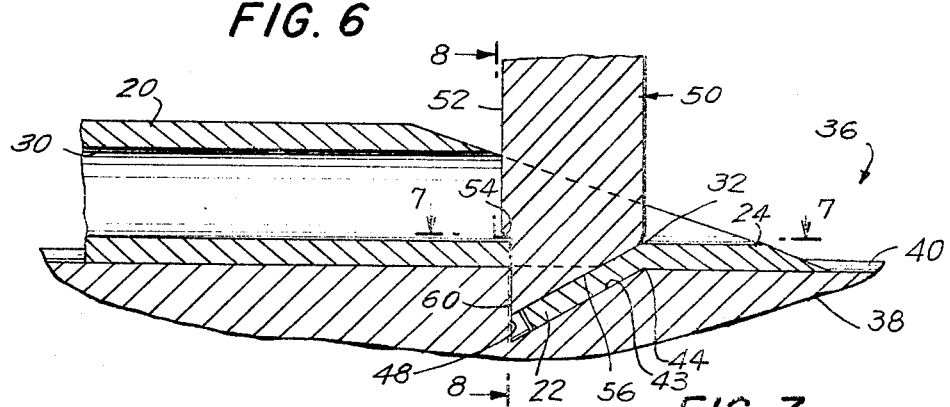
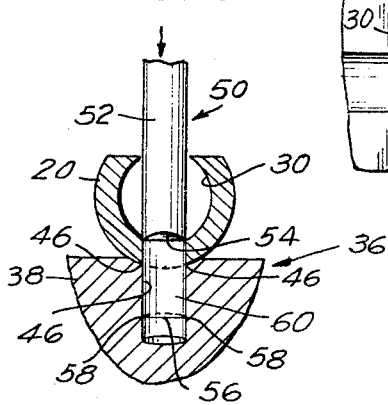
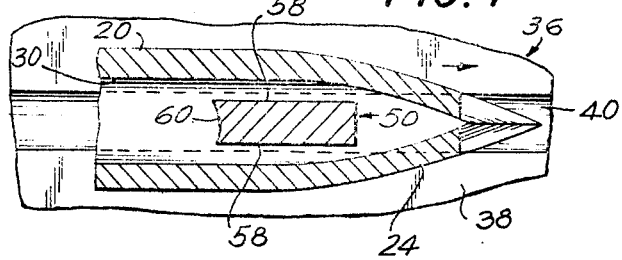
INVENTOR.
ROBERT M. CLARK
BY
Kane, Dalsimer & Kane
ATTORNEYS United States Patent Office 3,277,893
Patented Oct. 11, 1966

3,277,893
HYPODERMIC PROJECTILE WITH BARB IN THE CANNULA BEVEL
Robert M. Clark, Waldwick, N.J., assignor to Becton, Dickinson and Company, East Rutherford, N.J., a corporation of New Jersey
Filed Jan. 31, 1964, Ser. No. 341,497
2 Claims. (Cl. 128—215)

This invention relates to barbed cannulas and, more particularly, to an improved construction of barbed cannulas as well as a method for their manufacture.

In the treatment of domestic and wild animals, propelled syringes have been proposed. In this manner, it is possible to medically treat or immobilize for such purposes any animal from a distance. Thus, complete safety for both man and animal is reasonably assured when following this technique.

In firing the automatic injecting syringes, a compressed gas gun is employed. This instrument may assume any one of a number of forms presently being offered commercially today.

The proposed remote injection of animals enables the liquid to be administered to be injected upon contact or shortly thereafter. It is, therefore, not necessary to pursue and restrain animals for treatment; and an extremely valuable tool in the humane and economical treatment of animals is thus possible.

The uses for this humane approach are numerous. Without specifying precise applications for the equipment and technique, it should be evident that it has use in the treatment of livestock, handling of cattle, rabies control, treatment of zoo animals and management of wild life.

Syringes of the type presently being offered commercially and utilized in the treatment of animals have, out of necessity, been costly. Contributing to the cost to a rather significant extent has been the cannula cost. In manufacturing these cannulas, lateral projections in the form of collars were joined to the cannula by brazing or silver soldering. These collars play an important role during the injection cycle by providing means for retaining the syringe associated with the animal following penetration of the epidermis or skin of the animal by the penetrating end of the cannula. In the absence of such retaining means, the entire syringe, once the cannula has penetrated following traversal of the trajectory, may simply be forced out of the puncture by the very nature of the fibers and tissue being penetrated. Therefore, the intended treatment could not be effectively administered.

It is, therefore, an object of this invention to provide an improved barbed cannula having, among others, the above enumerated applications and uses wherein the barb is less expensively formed thereby contributing to the disposable nature of the cannula as well as the syringe projectile to which it is adapted to be secured.

Another object is to provide a method of fabricating the improved cannula whereby relatively simply and inexpensive punching and bending techniques are adopted, and which may readily be incorporated in the usual hypodermic needle or cannula manufacturing.

In accordance with this invention, a projection is punched and bent from within the lumen of a cannula point. This projection is effectively employed as a barb in holding a syringe projectile within the flesh of an animal being given a hypodermic injection.

Other objects and advantages will become apparent from the following detailed description which is to be taken in conjunction with the accompanying drawings illustrating a somewhat preferred embodiment of the invention.

FIG. 5 is a fragmentary perspective view partly in section illustrating the manner in which the projecting barb is formed and the tooling employed to accomplish this operation;

FIG. 6 is an enlarged fragmentary sectional view showing the punching and bending of the barb by such tooling;

FIG. 7 is a sectional view taken along the line 7—7 of FIG. 6; and

FIG. 8 is a sectional view taken along the line 8—8 of FIG. 6.

Figure 1:
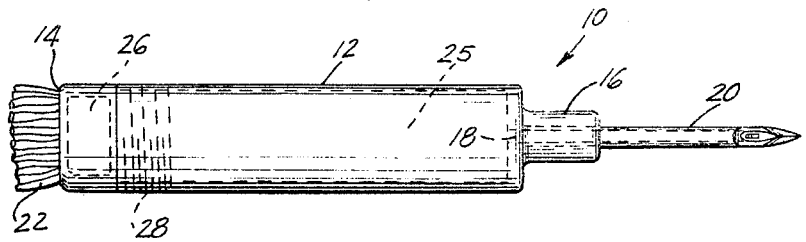
FIG. 1 is a side elevational view of a syringe projectile having a barbed cannula incorporating the teachings of this invention.
Figure 2:
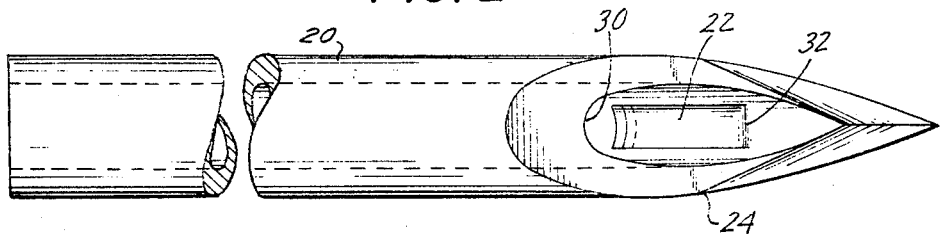
FIG. 2 is an enlarged side elevational view of the barbed cannula looking interiorly of the lumen of the cannula towards the projecting barb.
Figure 3:
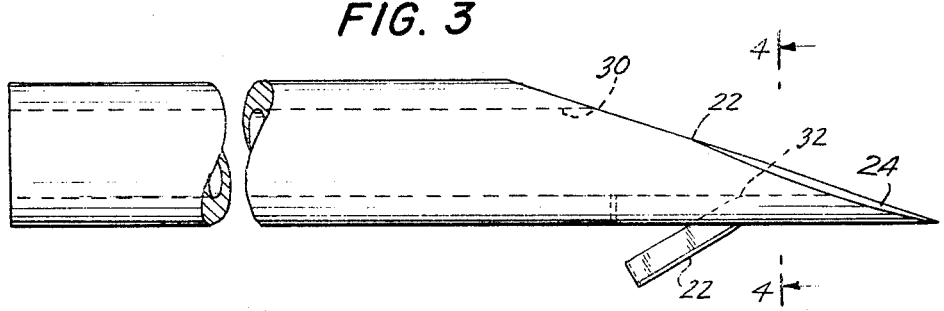
FIG. 3 is an enlarged elevational view of the cannula viewing the barb and penetrating end of the cannula at a position normal to that of FIG. 2.
Figure 4:
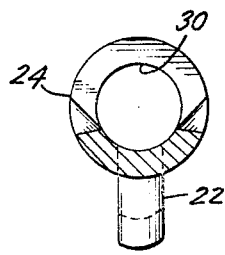
FIG. 4 is a cross sectional view taken along line 4—4 of FIG. 3 viewing the barb from still another direction.

Referring now particularly to FIG. 1, a projectile 10 is shown for delivering liquid medicament or various other agents to animals. The body of the device is in the nature of a syringe barrel or ampule 12 having a rear end 14 and a forward end reduced in the form of a boss 16 having a bore 18. A hypodermic needle or cannula 20 has its rear end mounted in the bore 18 and extends forwardly from the boss 16. The rear end of the barrel 14 is provided with a guiding or stabilizing tail or fin 22 for maintaining the projectile on the intended trajectory during flight. In this connection, the projectile is placed into a gun preferably of the compressed air or gas type and then fired therefrom.

The interior of the barrel 12 may assume the form and configuration in accordance with the suggested construction of U.S. Patent No. 2,854,925 granted October 7, 1958 and 2,923,243 granted February 2, 1960. Thus, the barrel 12 is divided into a forward liquid containing chamber or compartment 25, separated from a rear propelling compartment 26 by means of an interposed piston or plunger 28. The projecting compartment 26 is adapted to include a suitable propellant or gas generating means of the type proposed in the aforementioned patents.

The cannula 20 is advantageously provided with a barb 22 at the pointed piercing and penetrating end 24 defined typically by the bevel as illustrated. The barb 22 is formed by an integral projection stamped or otherwise worked from the walls of the cannula defining the lumen 30. The projecting barb 22 extends laterally and rearwardly at an acute angle with respect to the axis of the cannula and is integrally connected along the line 32 to the lumen walls. The thickness of the barb 22 corresponds in thickness to the walls of the cannula and is of substantially uniform thickness throughout. The barb 22 is wider than it is thick, as shown in the drawings. In this connection, the rear or free end of the projecting barb 22 particularly in view of the acuteness of the angle defined, will not materially effect the intended penetration of the fibers or tissue of the epidermis or flesh of the animal being injected. Once the penetrating end of the cannula has pierced the tissues and the cannula inserted the desired or contemplated extent, the barb 22 will serve to prevent the cannula together with the attached syringe from dislodging or working free, especially prior to the injection of the liquid contained in the compartment 25. With the barb of the cannula properly secured, the liquid will pass through the bore 18 and the aligned lumen 30 upon actuation of a propellant 26 which forces the piston or plunger 28 forwardly.

The length of the needle is generally selected according to the size of the animal. It should be long enough to inject the drug or medicament at the proper location while being short enough to minimize the possibility of hitting a bone or the like. The barb 22 of this invention will hold the cannula 20 and the attached syringe in the animal in spite of violent activity or attempts on the part of the animal to remove the syringe. The syringe is then recovered from the animal when convenient or after the animal has been suitably immobilized temporarily.

The component parts constituting the projectile 10 together with the needle 20 and formation of the barb 22 are all low cost items, the former being fabricated from suitable resinous or plastic material, while the latter is of the low cost disposable metallic hypodermic needle construction. Under these circumstances, the entire projectile need not be reused, but may be discarded after a single use.

In forming the barbed cannula 20 and particularly the barb 22, reference is now made to FIGS. 5 to 8, inclusive. A substantially finished hypodermic needle is subjected to a punching and bending operation by the apparatus or tool 36. This tool 36 pierces the walls of the cannula through the opening defined by the beveled end 24 of the cannula to form the barb 22. The tool 36 includes a die block 38 adapted to support the hypodermic needle or cannula to be worked. The block 38 is, accordingly, formed with a trough 40 for conveniently receiving the needle and may be provided with a correspondingly curved surface approximately that of the cannula. The block 38 may also incorporate suitable means, in addition to those disclosed, that will serve to properly orient the cannula supported in the trough 40. The block 38 is provided with a die cavity 42 having beveled face 43 serving to define the extent of obliquity of the barb 22. A bending surface is defined along the line 44 defining the integral connection 32 of the barb 22 with the walls of the cannula. The cavity 42 is provided with a pair of opposed shearing edges 46 and interposed edge 48 having a slightly curved configuration, as shown, to impart this shape to the free or terminal end of the barb 22. The block 38 may also include means for positioning the penetrating end 24 relative to the cavity 42 to assure a proper barb formation.

A punch 50 also forms part of the tool 36 and, in certain successful applications of this invention, was of the short stroke variety. Thus, the punch 50 is provided with a curved rear end 52 which serves to guide the punch and assure proper orientation of cannula 20 with respect to the punch 50 as well as the cavity 42. The base 54 of the curved end 52 serves as a limit stop against which the heel end of the penetrating end 24 is adapted to abut to properly position and orient the cannula within the tool 36. The lower end 56 of the punch 50 is formed with a pair of opposed and somewhat parallel edges 58 which cooperate with the shearing edges 46 of the die block 38 as well as a curved edge 60 that mates with the curved edge 48 of the block in suitably puncturing the barb from the walls of the cannula. The beveled or inclined nature of the wall 43 as well as the corresponding inclination of the lower end of the punch 50 serves to bend the barb following the shearing of the walls of the cannula along the line 32 and about the bending surface 44.

Following the bending operation, the punch is elevated and the needle withdrawn from the tool 36.

A cannula is, accordingly, provided by this invention whereby a barb is formed from a conventional hypodermic needle by a relatively simple and inexpensive punching and bending operation. By this method a relatively low cost barbed cannula is possible which, coupled with low cost construction of the remainder of the syringe projectile 10 from low cost plastic material, renders it possible to provide a disposable syringe projectile for treatment of animals.

Thus, among others, the aforenoted objects and advantages are most effectively attained. Although a single somewhat preferred embodiment of this invention has been disclosed in detail herein, it should be understood that this invention is in no sense limited thereby but its scope is to be taken by that of the appended claims.

I claim:

1. A projectile for injection of liquids into animals following traversal of a prescribed trajectory comprising a barrel, a stabilizer secured to the tail end of said barrel for stabilizing the flight of the projectile, a piston within said barrel intermediate its ends dividing the barrel into a front liquid carrying chamber and a rear propelling chamber for, respectively, carrying liquid to be injected and propelling means, a cannula having a forward beveled piercing and penetrating pointed end and being connected to the forward end of the barrel with the lumen of the cannula adapted to communicate with the liquid carrying chamber, whereby upon actuation of the propelling means the piston is driven forwardly to expel the liquid in the carrying chamber out through the lumen of the cannula, and a barb at the pointed penetrating end of the cannula within the confines of the bevel, said barb extending angularly with respect to the longitudinal axis of the cannula, said barb embodying a punched segment of the walls of the cannula at the penetrating end, said segment being bent outwardly with respect to the axis of the cannula, the segment being substantially planar with the plane of the segment extending rearwardly at an acute angle with respect to the axis of the cannula.

2. A cannula for use with a projectile for injection of liquids into animals following traversal of a prescribed trajectory, said cannula having a forward beveled piercing and penetrating pointed end, a barb at the pointed penetrating end of the cannula within the confines of the bevel, said barb extending angularly with respect to the longitudinal axis of the cannula, said barb embodying a punched segment of the walls of the cannula at the penetrating end, said segment being bent outwardly with respect to the axis of the cannula, the segment being substantially planar with the plane of the segment extending rearwardly at an acute angle with respect to the axis of the cannula, the thickness of the barb corresponding in thickness to the walls of the cannula, said barb being of uniform thickness throughout and the barb being wider than it is thick to resist removal by the animal when the piercing end has penetrated the skin of the animal.

References Cited by the Examiner

UNITED STATES PATENTS

| 1,815,300 | 7/1931 | Harris | 102—92 |
| 2,373,216 | 4/1945 | Zwickey | 273—106.5 |
| 2,486,286 | 10/1949 | Irving | 81—3.49 |
| 2,801,633 | 8/1957 | Ehrlich | 128—314 |
| 2,923,243 | 2/1960 | Crockford et al. | |
| 2,995,373 | 8/1961 | Cox | 128—215 X |

RICHARD A. GAUDET, *Primary Examiner.*

DALTON L. TRULUCK, *Examiner.*